US011255677B2

(12) United States Patent
Wang et al.

(10) Patent No.: US 11,255,677 B2
(45) Date of Patent: Feb. 22, 2022

(54) INTELLIGENT DEVICE NAVIGATION METHOD AND NAVIGATION SYSTEM

(71) Applicant: HUAZHONG UNIVERSITY OF SCIENCE AND TECHNOLOGY, Hubei (CN)

(72) Inventors: Wei Wang, Hubei (CN); Shengkai Zhang, Hubei (CN); Tao Jiang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 366 days.

(21) Appl. No.: 16/578,442

(22) Filed: Sep. 23, 2019

(65) Prior Publication Data
US 2020/0103231 A1 Apr. 2, 2020

(30) Foreign Application Priority Data
Sep. 30, 2018 (CN) .......................... 201811163117.6

(51) Int. Cl.
*G01C 21/16* (2006.01)
*G01S 13/58* (2006.01)
*G01S 7/40* (2006.01)

(52) U.S. Cl.
CPC .......... *G01C 21/165* (2013.01); *G01S 7/4004* (2013.01); *G01S 13/58* (2013.01)

(58) Field of Classification Search
CPC ....... G01C 21/16; G01C 21/165; G01S 14/58; G01S 7/40; G01S 7/4004
See application file for complete search history.

(56) References Cited

U.S. PATENT DOCUMENTS

2020/0294401 A1* 9/2020 Kerecsen ............. G05D 1/0287

* cited by examiner

*Primary Examiner* — Tan Q Nguyen
(74) *Attorney, Agent, or Firm* — JCIPRNET

(57) ABSTRACT

The present disclosure discloses an intelligent device navigation method and navigation system. The method comprises the following. Construct a plurality of antennas on a network card in the intelligent device into a linear antenna array. By using the linear antenna array, acquire channel state information of a wireless signal, and estimate an angle of arrival (AoA) and a time of flight (ToF) between the wireless signal transmitting device and the intelligent device. Measure inertial parameters of the intelligent device. Perform data fusion of the AoAs, the ToFs and the inertial parameters to estimate a state variable of the intelligent device. Adjust a motion state of the intelligent device with reference to the state variable, thereby achieving autonomous navigation of the intelligent device. The disclosure can estimate the state of the intelligent device by using wireless signals ubiquitous in the surrounding environment in a GPS unreliable environment.

12 Claims, 3 Drawing Sheets

INTELLIGENT DEVICE NAVIGATION METHOD AND NAVIGATION SYSTEM

CROSS-REFERENCE TO RELATED APPLICATION

This application claims the priority benefit of China application serial no. 201811163117.6, filed on Sep. 30, 2018. The entirety of the above-mentioned patent application is hereby incorporated by reference herein and made a part of this specification.

BACKGROUND

Technical Field

The present disclosure belongs to the cross-technology field of wireless communication and intelligent device control, and more particularly, relates to an intelligent device navigation method and navigation system.

Description of the Related Art

Intelligent devices have a wide range of applications in defense, security, aviation, exploration, etc., and are widely used in indoor and outdoor environments. Autonomous navigation is a must-have technology due to the need for the fast dynamics and complex operations of the intelligent devices. Autonomous navigation requires agents to perform highly autonomous behaviors or tasks, working long hours without intervention, which requires the intelligent devices to enable acquisition of information about the environment and estimation of at most six degrees of freedom (6-DoF) states (including not only the position but also the azimuth, linear velocity and angular velocity).

Reliable state estimation is the basis of autonomous navigation. The Global Navigation Satellite System (GNSS) provides a direct solution for state estimation, enabling the successful commercialization of a large number of outdoor applications for autonomous intelligent devices. However, GNSS signals are not reliable in Global Positioning System (GPS) unreliable environments such as narrow, cluttered or indoor environments, and such environments often require the mobility advantages of intelligent devices for various activities. In this case, researchers have proposed many solutions for autonomous navigation of a Micro Air Vehicle (MAV) assisted with a visual/laser sensor. However, applications in indoor environments often require the use of agile small intelligent devices (such as small drones) in confined areas, and such small intelligent devices are limited in size, weight and power. These limitations affect the ability of the small intelligent devices to carry heavy-duty sensors such as radar or LiDAR. In addition, the small intelligent devices cannot carry a multi-view stereo camera system due to a short baseline length, but can only carry a monocular vision navigation system, which is not only computationally complex, but also susceptible to environmental lighting conditions.

In general, at present, the navigation systems of intelligent devices in GPS unreliable environments mainly rely on visual sensing and laser sensing for positioning. However, visual sensing navigation is computationally complex and susceptible to lighting conditions; and laser sensing equipment is expensive and heavy, and is not suitable for small intelligent device platforms.

SUMMARY

In view of the above-described defects or improvement requirements in the art, the present disclosure provides an intelligent device navigation method and navigation system, which aims to estimate a state of the intelligent device by using wireless signals ubiquitous in the surrounding environment in a GPS unreliable environment. Thereby, accurate autonomous navigation of the intelligent device is achieved at a low cost.

In order to achieve the above objective, according to a first aspect of the present disclosure, an intelligent device navigation method for achieving autonomous navigation of an intelligent device, comprising the following.

(1) Construct a plurality of antennas on a network card in the intelligent device into a linear antenna array, wherein each of the antenna is an array element.

(2) By using the linear antenna array, acquire channel state information (CSI) of a wireless signal transmitted by a wireless signal transmitting device in an environment, and estimate an angle of arrival (AoA) and a time of flight (ToF) between the wireless signal transmitting device and the intelligent device; measure inertial parameters of the intelligent device by using an inertial measurement unit.

(3) Perform data fusion of the AoAs, the ToFs and the inertial parameters by a sliding window estimator to estimate a state variable of the intelligent device.

(4) Adjust a motion state of the intelligent device with reference to the state variable, thereby achieving autonomous navigation of the intelligent device.

Wherein the wireless signal is an orthogonal frequency-division multiplexing (OFDM) signal, and the sliding window estimator is configured to save the latest state variables of the intelligent device and position information of the current observable wireless signal transmitting device(s).

Since wireless signal resources (e.g., WiFi resources) are ubiquitous in indoor locations, and wireless signal resources can provide reliable information about the environment (e.g., AoA and ToF), the intelligent device navigation method according to the present disclosure utilizes wireless positioning technology to measure the AoA and ToF between the intelligent device and the wireless signal transmitting device in the environment, and to estimate the state variable of the intelligent device in combination with the inertial parameters of the intelligent device, thereby achieving accurate autonomous navigation of the intelligent device.

Further, in the step (2), a method of estimating the AoA and the ToF between the wireless signal transmitting device and the intelligent device comprises the following.

(21) Superimpose the CSIs of N OFDM signal subcarriers received by the linear antenna array to obtain a measurement signal matrix X', and perform CSI smoothing on the measurement signal matrix X' to obtain a signal measurement matrix X whose rank is larger than a number of wireless signal travel paths.

(22) According to a steering vector model and the signal measurement matrix X, acquire an AoA and a ToF corresponding to each travel path by a MUltiple SIgnal Classification (MUSIC) algorithm.

(23) Determine a travel path having a minimum ToF as a direct path, and determine an AoA and the ToF corresponding to the direct path as the AoA and the ToF between the wireless signal transmitting device and the intelligent device.

Wherein the steering vector model is used to describe, by using the AoA and the ToF, a phase offset introduced by the respective array elements.

Further, the steering vector model is:

$$\vec{a}(\theta, \tau) = \left[ \underbrace{1, \Omega_\tau^1, \Omega_\tau^2, \ldots, \Omega_\tau^{N-1}}_{\text{element 1}}, \underbrace{\Phi_\theta, \Omega_\tau^1 \Phi_\theta, \Omega_\tau^2 \Phi_\theta, \ldots, \Omega_\tau^{N-1} \Phi_\theta}_{\text{element 2}}, \ldots, \underbrace{\Phi_\theta^{M-1}, \ldots, \Omega_\tau^{N-1} \Phi_\theta^{M-1}}_{\text{element M}} \right]^T,$$

wherein $\Phi_\theta$ and $\Omega_\tau$ are respectively expressed as:

$$\Phi_\theta = e^{-j2\pi \times d \times \sin(\theta) \times f/c}; \text{ and}$$

$$\Omega_\tau = e^{-j2\pi \times f_\delta \times \tau},$$

wherein the superscript represents an exponent of the power operation, $\theta$ represents an AoA, $\tau$ represents a ToF, $\vec{a}(\theta, \tau)$ represents a phase offset caused by the array elements corresponding to a travel path with an AoA of $\theta$ and a ToF of $\tau$, $\Phi_\theta$ represents a phase offset introduced by the array elements corresponding to a travel path with AoA of $\theta$, $\Omega_\tau$ represents a phase offset introduced by the array elements corresponding to a travel path with ToF of $\tau$, d represents a spacing between two adjacent array elements, f represents a frequency of a transmitted signal, c represents a velocity of light, $f_\delta$ represents a frequency spacing between adjacent subcarriers, and M and N respectively represent the number of array elements in the linear antenna array and the number of subcarriers for the transmission of wireless signals.

Further, the step (3) includes the following steps.

(31) Construct a measurement information matrix of the inertial measurement unit according to the inertial parameters measured by the inertial measurement unit, and calculate a measurement vector of the inertial measurement unit;

(32) Construct a measurement information matrix of wireless signals according to CSIs of the acquired wireless signals, and calculate a measurement vector of the wireless signals.

(33) According to the sliding window estimator, the measurement information matrix and the measurement vector of the inertial measurement unit, and the measurement information matrix and the measurement vector of the wireless signals, calculate a current sliding window estimator by minimizing a sum of Mahalanobis norm of all measurement errors; take the latest state variable in the current sliding window estimator as the estimated state variable.

Further, in the step (31), the measurement vector of the inertial measurement unit is calculated according to an equation below:

$$\widehat{z}_{1_{B_{k+1}}}^{B_k} =$$

$$\begin{bmatrix} \hat{\alpha}_{B_{k+1}}^{B_k} \\ \hat{\beta}_{B_{k+1}}^{B_k} \\ \hat{0} \end{bmatrix} = \begin{bmatrix} R_{B_0}^{B_k}(p_{B_{k+1}}^{B_0} - p_{B_k}^{B_0}) - v_{B_k}^{B_k} \Delta t + \frac{g^{B_k} \Delta t^2}{2} \\ R_{B_{k+1}}^{B_k} v_{B_{k+1}}^{B_{k+1}} - v_{B_k}^{B_k} + g^{B_k} \Delta t \\ R_{B_{k+1}}^{B_k} g^{B_{k+1}} - g^{B_k} \end{bmatrix} = \widehat{H}_{1_{B_{k+1}}}^{B_k} \chi + n_{1_{B_{k+1}}}^{B_k},$$

wherein $B_0$ represents a body frame of the intelligent device when a $0^{th}$ AoA is obtained, $B_k$ and $B_{k+1}$ respectively represent body frames of the intelligent device when $k^{th}$ and $(k+1)^{th}$ AoAs are obtained, $$\widehat{z}_{1_{B_{k+1}}}^{B_k}$$

represents a measurement information matrix of the inertial measurement unit between when the $k^{th}$ AoA is obtained and when the $(k+1)^{th}$ AoA is obtained, $\hat{\alpha}_{B_{k+1}}^{B_k}$ and $\hat{\beta}_{B_{k+1}}^{B_k}$ are both covariance matrixes calculated by the measurement information matrix $$\widehat{z}_{1_{B_{k+1}}}^{B_k},$$

$R_{B_0}^{B_k}$ represents a transfer matrix of the frame $B_k$ relative to the frame $B_0$, $p_{B_{k+1}}^{B_0}$ represents a position matrix of the frame $B_0$ relative to the frame $B_{k+1}$, $\Delta t$ represents a time difference between when the $k^{th}$ AoA is obtained and when the $(k+1)^{th}$ AoA is obtained, $R_{B_{k+1}}^{B_k}$ represents a transfer matrix of the frame $B_k$ relative to the frame $B_{k+1}$, $v_{B_{k+1}}^{B_{k+1}}$ represents a velocity matrix of the frame $B_{k+1}$ relative to the frame $B_{k+1}$, $g^{B_{k+1}}$ represents an earth gravity vector in the frame $B_{k+1}$, $$\widehat{H}_{1_{B_{k+1}}}^{B_k}$$

represents a measurement vector of the inertial measurement unit, $$n_{1_{B_{k+1}}}^{B_k}$$

represents a measurement noise of the inertial measurement unit, and $\chi$ represents a full state parameter vector composed of all state variables and position information of the wireless signal transmitting devices in the sliding window estimator.

Further, in the step (32), the measurement vector of the wireless signals is calculated according to an equation below:

$$\hat{\tilde{z}}_{2_l}^{B_j} =$$

$$\hat{0} = \begin{bmatrix} -1 & 0 & \hat{u}_l^{B_j} \\ 0 & -1 & \hat{v}_l^{B_j} \end{bmatrix} R_{B_0}^{B_j} \left( p_{B_k}^{B_0} - p_{B_j}^{B_0} + d_l R_{B_i}^{B_0} \begin{bmatrix} u_l^{B_i} \\ v_l^{B_i} \\ 1 \end{bmatrix} \right) = \widehat{\tilde{H}_{2}}_l^{B_j} \chi + n_{2_l}^{B_j},$$

wherein $B_0$ represents a body frame of the intelligent device when a $0^{th}$ AoA is obtained, $B_k$, $B_i$ and $B_j$ respectively represent body frames of the intelligent device when $k^{th}$, $i^{th}$ and $j^{th}$ AoAs are obtained, $\hat{\tilde{z}}_{2_l}^{B_j}$ represents a signal matrix measured from a $l^{th}$ wireless signal transmitting device when the $j^{th}$ AoA is obtained, $\hat{u}_l^{B_j}$ represents the cosine of the measurement value of the AoA, $\hat{v}_l^{B_j}$ represents the sine of the measurement value of the AoA, $u_l^{B_i}$ represents the cosine of the true value of the AoA, $v_l^{B_i}$ represents the sine of the true value of the AoA, $R_{B_0}^{B_j}$ represents a transfer matrix of the frame $B_j$ relative to the frame $B_0$, $p_{B_{k+1}}^{B_0}$ represents a position matrix of the frame $B_0$ relative to the frame $B_{k+1}$, $p_{B_j}^{B_0}$ represents a position matrix of the frame $B_0$ relative to the frame $B_j$, $R_{B_i}^{B_0}$ represents a transfer matrix of the frame $B_0$ relative to the frame $B_i$, $d_l$ represents a distance between the $l^{th}$ wireless signal transmitting device and the intelligent device, $\widehat{\tilde{H}_{2}}_l^{B_j}$ a measurement vector measured from the $l^{th}$ wireless signal transmitting device when the $j^{th}$ AoA is obtained, $n_{2_l}^{B_j}$ represents a measurement noise of the wireless signals, and $\chi$ represents a full state parameter vector composed of all state variables and position information of the wireless signal transmitting devices in the sliding window estimator.

Further, in the step (33), the current sliding window estimator is calculated according to an equation below:

$$(\Lambda_p + \Lambda_{imu} + \Lambda_{WiFi})\chi = (b_p + b_{imu} + b_{WiFi}) \quad (1),$$

wherein $b_p$ are $\Lambda_p$ are both priori information of the intelligent device, $\Lambda_{imu}$ and $b_{imu}$ respectively represent the measurement information matrix and the measurement vector of the inertial measurement unit, $\Lambda_{WiFi}$ and $b_{WiFi}$ respectively represent the measurement information matrix and the measurement vector of the wireless signals, and $\chi$ represents a full state parameter vector composed of all state variables and position information of the wireless signal transmitting devices in the sliding window estimator.

Further, the sliding window estimator slides with an increase in the number of obtained AoAs, and when the sliding window estimator slides, the old state variable and the position information of the unobservable wireless signal transmitting device are removed by applying Schur complement to the equation (1).

In order to constrain the computational complexity, the sliding window estimator only keeps the latest states, removing the old state of the intelligent device and the position information of the unobservable wireless signal transmitting device; in the commonly used method of removing the old state, these parameters are removed from the system equation. However, this will result in the loss of a portion of the information, and using only the measurement information in the sliding window will make the metric scale of environments unobservable. When solving the optimization model, by applying the Schur complement to the least squares equations corresponding to the optimization model, the parameters to be removed can be marginalized, thereby avoiding the problem of scale inconsistency due to information loss.

Further, the full state parameter vector $\chi$ is expressed as:

$$\chi = [x_{B_s}^{B_0}, x_{B_{s+1}}^{B_0}, \ldots, x_{B_{N_1+s-1}}^{B_0}, a_1, a_2, \ldots, a_{N_2}],$$

wherein $N_1$ and $N_2$ respectively represent the total number of state variables and the total number of wireless signal transmitting devices currently observable by the intelligent device included in the sliding window estimator, s represents an integer greater than or equal to 0, $B_0$ represents the body frame of the intelligent device when the $0^{th}$ AoA is obtained, $B_k$ represents the body frame of the intelligent device when the $k^{th}$ AoA is obtained, $x_{B_k}^{B_0} = [p_{B_k}^{B_0}, v_{B_k}^{B_k}, g^{B_k}]$ represents an obtained $k^{th}$ state variable of the intelligent device, $p_{B_k}^{B_0}$ represents a position matrix of the frame $B_0$ relative to the frame $B_k$, $v_{B_k}^{B_k}$ represents a velocity matrix of the frame $B_k$ relative to the frame $B_k$, $g^{B_k}$ represents an earth gravity vector in the frame $B_k$, a value of i satisfies $1 \leq i \leq N_2$, and $a_i$ represents a position of the $i^{th}$ wireless signal transmitting device.

Since the number of state variables of the intelligent device and the number of position information of the wireless signal transmitting devices in the sliding window estimator are limited, the navigation method according to the present disclosure can address the state estimation problem with stable computation time complexity. In addition, since the sliding window estimator contains both state variables of the intelligent device and position information of the wireless signal transmitting devices, position information of the wireless signal transmitting device can be obtained while obtaining the state variable of the intelligent device.

According to a second aspect of the present disclosure, there is provided an intelligent device navigation system for achieving autonomous navigation of an intelligent device, comprising: a wireless positioning module, an inertial measurement unit, a state estimation module and a control module.

The wireless positioning module is configured to acquire CSI of a wireless signal transmitted by a wireless signal transmitting device in an environment by using an antenna array and estimate an AoA and a ToF between the wireless signal transmitting device and the intelligent device.

The inertial measurement unit is configured to measure inertial parameters of the intelligent device.

The state estimation module is configured to perform data fusion of the AoAs, the ToFs and the inertial parameters by a sliding window estimator to estimate a state variable of the intelligent device.

The control module is configured to adjust a motion state of the intelligent device with reference to the state variable, thereby achieving autonomous navigation of the intelligent device.

Wherein the wireless signal is an OFDM signal, the sliding window estimator is configured to save the latest state variables of the intelligent device and position information of the wireless signal transmitting device(s), and the antenna array is a linear antenna array composed by a plurality of antennas on a network card in the intelligent device, each of the antenna being an array element.

In general, by comparing the above technical solution of the present inventive concept with the prior art, the present disclosure has the following beneficial effects.

(1) The intelligent device navigation method according to the present disclosure utilizes wireless positioning technology to measure the AoA and ToF between the intelligent device and the wireless signal transmitting device in the environment, and to estimate the state variable of the intelligent device in combination with the inertial parameters of the intelligent device, thereby achieving autonomous navigation of the intelligent device. Since the positioning of the intelligent device is achieved by utilizing the wireless network infrastructure ubiquitous in the environment in the autonomous navigation process, accurate positioning information can still be provided in the GPS unreliable environment. Therefore, problems such as complicated calculation, susceptiblity to lighting conditions, expensive equipment, heavy weight and limited application caused by positioning by virtue of visual sensing and laser sensing in the existing navigation systems can be effectively solved.

(2) The intelligent device navigation method according to the present disclosure utilizes a sliding window estimator to achieve data fusion of the AoAs, the ToFs and the inertial parameters of the intelligent device after obtaining the AoA and the ToF between the wireless signal transmitting device and the intelligent device as well as the inertial parameters of the intelligent device, thereby estimating the state variable of the intelligent device. Since the number of state variables of the intelligent device and the number of position information of the wireless signal transmitting devices in the sliding window estimator are limited, the intelligent device navigation method according to the present disclosure can address the state estimation problem with stable computation time complexity.

(3) In intelligent device navigation method according to the present disclosure, since the model designed for describing the sliding window estimator contains both state variables of the intelligent device and position information of the wireless signal transmitting devices, position information of the wireless signal transmitting device can be obtained while a state variable of the intelligent device can be obtained by solving the model.

(4) In intelligent device navigation method according to the present disclosure, the sliding window estimator for achieving data fusion slides with an increase in the number of the obtained AoAs, and when the sliding window estimator slides, the old state variable and the position information of the unobservable wireless signal transmitting device are removed by applying Schur complement to the least square equations corresponding to the optimization model. By removing the parameters in such a manner, the parameters to be removed can be marginalized, thereby avoiding the problem of scale inconsistency due to information loss in the process of removing parameters.

BRIEF DESCRIPTION OF THE DRAWINGS

FIG. 4A shows three-dimensional positions of an intelligent device; and FIG. 4B shows three-dimensional positions of a surrounding router.

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

The existing navigation systems mainly rely on visual sensing and laser sensing for positioning in GPS unreliable environments. However, visual sensing navigation is computationally complex and susceptible to lighting conditions; and laser sensing equipment is expensive and heavy, and is not suitable for small intelligent device platforms. The key factor for navigation of an intelligent device is positioning, and the accuracy of wireless indoor positioning has reached the decimeter level in the latest advances. Thus, by an inertial measurement unit (IMU) of the intelligent device assisted with wireless positioning technology, accurate autonomous navigation can be achieved even in GPS unreliable environments.

Since wireless signal resources (e.g., WiFi resources) are ubiquitous in indoor locations, and the wireless signal resources can provide reliable information about the environment (e.g., AoA and ToF), a wireless signal transmitting device (AP) that provides wireless signals can be an environmental reference landmark. In the following embodiments, the wireless signal transmitting device in the environment is a router, and the wireless signals are OFDM signals.

An intelligent device navigation method for achieving autonomous navigation of an intelligent device according to the present disclosure comprises the following.

(1) Construct a plurality of antennas on a network card in the intelligent device into a linear antenna array, in which each of the antenna is an array element.

Figure 1:
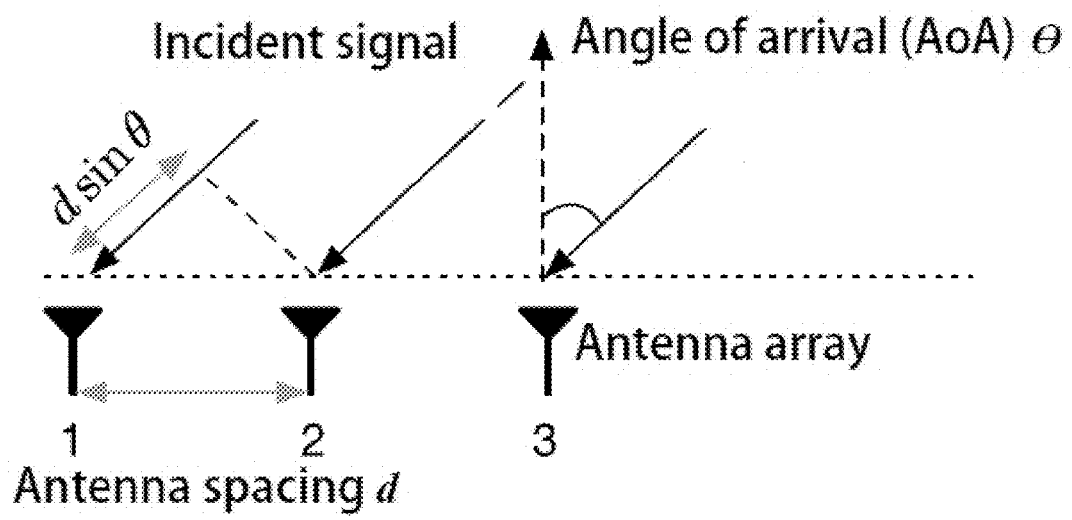
FIG. 1 is a schematic diagram of an antenna array according to embodiments of the present disclosure.

As shown in FIG. 1, in this embodiment, the antenna array includes three antennas, and the distance between adjacent antennas is d.

(2) By using the antenna array, acquire channel state information (CSI) of a wireless signal transmitted by a wireless signal transmitting device in an environment, and estimate an angle of arrival (AoA) and a time of flight (ToF) between the wireless signal transmitting device and the intelligent device; measure inertial parameters of the intelligent device by using an inertial measurement unit.

In an alternative embodiment, the method of estimating the AoA and the ToF between the wireless signal transmitting device and the intelligent device includes the following.

(21) Superimpose the CSIs of N OFDM signal subcarriers received by the antenna array to obtain a measurement signal matrix X', and perform CSI smoothing on the measurement signal matrix X' to obtain a signal measurement matrix X whose rank is larger than a number of wireless signal travel paths.

In order to solve for the AoA and the ToF between the wireless signal transmitting device and the intelligent device with a MUSIC algorithm, it is necessary to ensure that the number of columns of the input measurement signal matrix is larger than the number of wireless signal travel paths. In the present embodiment, since the initially obtained measurement signal matrix is a matrix with single column, which does not meet the requirements of the MUSIC algorithm, a CSI smoothing method is adopted to construct a new measurement matrix by performing translation slip with measured values of the first N/2 subcarriers corresponding to the first two array elements as a reference, and the smoothed measurement matrix can have a dimension of up to N×(N+2). Through the CSI smoothing method, the obtained signal measurement matrix X is allowed to have a rank larger than the number of wireless signal travel paths, thereby meeting the requirements of the MUSIC algorithm.

(22) According to a steering vector model and the signal measurement matrix X, acquire an AoA and a ToF corresponding to each travel path by a MUSIC algorithm.

(23) Determine a travel path having a minimum ToF as a direct path, and determine an AoA and the ToF corresponding to the direct path as the AoA and the ToF between the wireless signal transmitting device and the intelligent device.

Among the multiple travel paths, the path corresponding to the minimum ToF is the direct path. Since the sampling clocks of the digital-to-analog converter (DAC) and the analog-to-digital converter (ADC) in the transmitter and the receiver are not synchronized in the standard wireless communication network, the ToF estimated by the MUSIC algorithm here includes a delay caused by the difference in sampling clocks, and is thus not a true transmission time of the signal from the transmitting end to the receiving end. In addition, since the electromagnetic wave travels at the speed of light, and the delay of several tens of nanoseconds can cause the distance error of the meter level, the ToF estimated by the MUSIC algorithm here cannot represent a true signal transmission distance. Even so, since the delay caused by the difference in sampling clocks affects ToFs of all the paths simultaneously, the conclusion that the path corresponding to the minimum ToF is the signal direct path still holds.

The steering vector model is used to describe a phase offset introduced by corresponding array elements by using the AoA and the ToF. In this embodiment, the steering vector model is:

$$\vec{a}(\theta,\tau) = \left[\underbrace{1, \Omega_\tau^1, \Omega_\tau^2, \ldots, \Omega_\tau^{N-1}}_{\text{element 1}}, \underbrace{\Phi_\theta, \Omega_\tau^1\Phi_\theta, \Omega_\tau^2\Phi_\theta, \ldots, \Omega_\tau^{N-1}\Phi_\theta}_{\text{element 2}}, \ldots, \underbrace{\Phi_\theta^{M-1}, \ldots, \Omega_\tau^{N-1}\Phi_\theta^{M-1}}_{\text{element M}}\right]^T,$$

where $\Phi_\theta$ and $\Omega_\tau$ are respectively expressed as:

$$\Phi_\theta = e^{-j2\pi \times d \times \sin(\theta) \times f/c}; \text{ and}$$

$$\Omega_\tau = e^{-j2\pi \times f_\delta \times \tau},$$

in which the superscript represents an exponent of the power operation, $\theta$ represents an AoA, $\tau$ represents a ToF, $\vec{a}(\theta,\tau)$ represents a phase offset caused by the array elements corresponding to a travel path with an AoA of $\theta$ and a ToF of $\tau$, $\Phi_\theta$ represents a phase offset introduced by the array elements corresponding to a travel path with AoA of $\theta$, $\Omega_\tau$ represents a phase offset introduced by the array elements corresponding to a travel path with ToF of $\tau$, d represents a spacing between two adjacent array elements, f represents a frequency of a transmitted signal, c represents a velocity of light, $f_\delta$ represents a frequency spacing between adjacent subcarriers, and M and N respectively represent the number of array elements in the antenna array and the number of subcarriers for the transmission of wireless signals.

(3) Perform data fusion of the AoAs, the ToFs and the inertial parameters by a sliding window estimator to estimate a state variable of the intelligent device, the sliding window estimator is configured to save the latest state variables of the intelligent device and position information of the current observable wireless signal transmitting device(s).

In an alternative embodiment, the step (3) includes the following steps.

(31) Construct a measurement information matrix of the inertial measurement unit according to the inertial parameters measured by the inertial measurement unit, and calculate a measurement vector of the inertial measurement unit.

In the present embodiment, the measurement vector of the inertial measurement unit is calculated according to an equation below:

$$\vec{z}_{1_{B_{k+1}}}^{B_k} = \begin{bmatrix} \hat{\alpha}_{B_{k+1}}^{B_k} \\ \hat{\beta}_{B_{k+1}}^{B_k} \\ \hat{0} \end{bmatrix} = \begin{bmatrix} R_{B_0}^{B_k}(p_{B_{k+1}}^{B_0} - p_{B_k}^{B_0}) - v_{B_k}^{B_k}\Delta t + \dfrac{g^{B_k}\Delta t^2}{2} \\ R_{B_{k+1}}^{B_k} v_{B_{k+1}}^{B_{k+1}} - v_{B_k}^{B_k} + g^{B_k}\Delta t \\ R_{B_{k+1}}^{B_k} g^{B_{k+1}} - g^{B_k} \end{bmatrix} = \vec{H}_{1_{B_{k+1}}}^{B_k} \chi + n_{1_{B_{k+1}}}^{B_k},$$

where $B_0$ represents a body frame of the intelligent device when a $0^{th}$ AoA is obtained, $B_k$ and $B_{k+1}$ respectively represent body frames of the intelligent device when $k^{th}$ and $(k+1)^{th}$ AoAs are obtained, $$\vec{z}_{1_{B_{k+1}}}^{B_k}$$

represents a measurement information matrix of the inertial measurement unit between when the $k^{th}$ AoA is obtained and when the $(k+1)^{th}$ AoA is obtained, $\hat{\alpha}_{B_{k+1}}^{B_k}$ and $\hat{\beta}_{B_{k+1}}^{B_k}$ are both covariance matrixes calculated by the measurement information matrix $$\vec{z}_{1_{B_{k+1}}}^{B_k},$$

$R_{B_0}^{B_k}$ represents a transfer matrix of the frame $B_k$ relative to the frame $B_0$, $p_{B_{k+1}}^{B_0}$ represents a position matrix of the frame $B_0$ relative to the frame $B_{k+1}$, $\Delta t$ represents a time difference between when the $k^{th}$ AoA is obtained and when the $(k+1)^{th}$ AoA is obtained, $R_{B_{k+1}}^{B_k}$ represents a transfer matrix of the frame $B_k$ relative to the frame $B_{k+1}$, $v_{B_{k+1}}^{B_{k+1}}$ represents a velocity matrix of the frame $B_{k+1}$ relative to the frame $B_{k+1}$, $g^{B_{k+1}}$ represents an earth gravity vector in the frame $B_{k+1}$, $$\hat{H}_{1_{B_{k+1}}}^{B_k}$$

represents a measurement vector of the inertial measurement unit, $$n_{1_{B_{k+1}}}^{B_k}$$

represents a measurement noise of the inertial measurement unit. The equation set of calculating the covariance matrixes $\hat{\alpha}_{B_{k+1}}^{B_k}$ and $\hat{\beta}_{B_{k+1}}^{B_k}$ by the measurement information matrix $$\hat{z}_{1_{B_{k+1}}}^{B_k}$$

is:

$$\begin{cases} p_{B_{k+1}}^{B_0} = p_{B_k}^{B_0} + R_{B_k}^{B_0} v_{B_k}^{B_k} \Delta t - R_{B_k}^{B_0} g^{B_k} \frac{\Delta t^2}{2} + R_{B_k}^{B_0} \alpha_{B_{k+1}}^{B_k} \\ v_{B_{k+1}}^{B_{k+1}} = R_{B_k}^{B_{k+1}} v_{B_k}^{B_k} - R_{B_k}^{B_{k+1}} g^{B_k} \Delta t + R_{B_k}^{B_{k+1}} \beta_{B_{k+1}}^{B_k} \\ g^{B_{k+1}} = R_{B_k}^{B_{k+1}} g^{B_k} \end{cases}$$

(32) Construct a measurement information matrix of wireless signals according to CSIs of the acquired wireless signals, and calculate a measurement vector of the wireless signals.

In the present embodiment, the measurement vector of the wireless signals is calculated according to an equation below:

$$\hat{z}_{2_l}^{B_j} =$$

$$\hat{0} = \begin{bmatrix} -1 & 0 & \hat{u}_l^{B_j} \\ 0 & -1 & \hat{v}_l^{B_j} \end{bmatrix} R_{B_0}^{B_j} \left( p_{B_k}^{B_0} - p_{B_j}^{B_0} + d_l R_{B_i}^{B_0} \begin{bmatrix} u_l^{B_i} \\ v_l^{B_i} \\ 1 \end{bmatrix} \right) = \hat{H}_{2_l}^{B_j} \chi + n_{2_l}^{B_j},$$

where $B_i$ and $B_j$ respectively represent body frames of the intelligent device when $i^{th}$ and $j^{th}$ AoAs are obtained, $\hat{z}_{2_l}^{B_j}$ represents a signal matrix measured from a $l^{th}$ wireless signal transmitting device when the $j^{th}$ AoA is obtained, $\hat{u}_l^{B_j}$ represents the cosine of the measurement value of the AoA, $\hat{v}_l^{B_j}$ represents the sine of the measurement value of the AoA, $u_l^{B_i}$ represents the cosine of the true value of the AoA, $v_l^{B_i}$ represents the sine of the true value of the AoA, $R_{B_0}^{B_j}$ represents a transfer matrix of the frame $B_j$ relative to the frame $B_0$, $p_{B_{k+1}}^{B_0}$ represents a position matrix of the frame $B_0$ relative to the frame $B_{k+1}$, $p_{B_j}^{B_0}$ represents a position matrix of the frame $B_0$ relative to the frame $B_j$, $R_{B_i}^{B_0}$ represents a transfer matrix of the frame $B_0$ relative to the frame $B_i$, $d_l$ represents a distance between the $l^{th}$ wireless signal transmitting device and the intelligent device, $\hat{H}_{2_l}^{B_j}$ represents a measurement vector measured from the $l^{th}$ wireless signal transmitting device when the $j^{th}$ AoA is obtained, $n_{2_l}^{B_j}$ represents a measurement noise of the wireless signals.

(33) According to the sliding window estimator, the measurement information matrix and the measurement vector of the inertial measurement unit, and the measurement information matrix and the measurement vector of the wireless signals, calculate a current sliding window estimator by minimizing a sum of Mahalanobis norm of all measurement errors; take the latest state variable in the current sliding window estimator as the estimated state variable.

Since the position of the router is unknown, the state estimation essentially solves the problem of simultaneous localization and mapping (SLAM). The state estimation is described as a state estimation problem of assisting IMU with the wireless system, and the wireless positioning module and the IMU measurement data are combined to obtain a maximum likelihood estimation by minimizing the sum of the Mahalanobis norm of all measurement errors. The specific solution model is as follow:

$$\min_{\chi} \left\{ (b_p - \Lambda_p \chi) + \sum_{k \in D} \left\| \hat{z}_{B_{k+1}}^{B_k} - \hat{H}_{B_{k+1}}^{B_k} \chi \right\|_{P_{B_{k+1}}^{B_k}}^2 + \sum_{(l,j) \in C} \left\| \hat{z}_l^{B_j} - \hat{H}_l^{B_j} \chi \right\|_{P_l^{B_j}}^2 \right\}.$$

In the above solution model, D represents a set of all measurement data of the IMU, C represents a set of all measurement data of the wireless positioning module, $$\sum_{k \in D} \left\| \hat{z}_{B_{k+1}}^{B_k} - \hat{H}_{B_{k+1}}^{B_k} \chi \right\|_{P_{B_{k+1}}^{B_k}}^2$$

represents a measurement error of the IMU, $$\sum_{(l,j) \in C} \left\| \hat{z}_l^{B_j} - \hat{H}_l^{B_j} \chi \right\|_{P_l^{B_j}}^2$$

represents a measurement error of the wireless positioning module, and $b_p$ and $\Lambda_p$ are both priori information of the intelligent device. Since the all the restrictions are linear, in the present embodiment, the above solution model is organized, and finally, the current sliding window estimator may be calculated according to an equation below:

$$(\Lambda_p + \Lambda_{imu} \Lambda_{WiFi}) \chi = (b_p + b_{imu} + b_{WiFi}) \qquad (1),$$

where $b_p$ are $\Lambda_p$ are both priori information of the intelligent device, $\Lambda_{imu}$ and $b_{imu}$ respectively represent the measurement information matrix and the measurement vector of the inertial measurement unit, $\Lambda_{WiFi}$ and $b_{WiFi}$ respectively represent the measurement information matrix and the measurement vector of the wireless signals.

In the present embodiment, the sliding window estimator slides with an increase in the number of obtained AoAs, and when the sliding window estimator slides, the old state variable and the position information of the unobservable wireless signal transmitting device are removed by applying Schur complement to the least square equations corresponding to the equation (1).

In order to constrain the computational complexity, the sliding window estimator only keeps the latest states, removing the old state of the intelligent device and the position information of the unobservable wireless signal transmitting device; in the commonly used method of removing the old state, these parameters are removed from the system equation. However, this will result in the loss of a portion of the information, and using only the measurement information in the sliding window will result in scale inconsistency. When solving the optimization model, by applying the Schur complement to the least squares equations corresponding to the optimization model, the parameters to be removed can be marginalized, thereby avoiding the problem of scale inconsistency due to information loss.

In the above equation, $\chi$ represents a full state parameter vector composed of all state variables and position information of the wireless signal transmitting devices in the sliding window estimator, and the full state parameter vector $\chi$ may be expressed as:

$$\chi = [x_{B_s}^{B_0}, x_{B_{s+1}}^{B_0}, \ldots, x_{B_{N_1+s-1}}^{B_0}, a_1, a_2, \ldots, a_{N_2}],$$

where $N_1$ and $N_2$ respectively represent the total number of state variables and the total number of wireless signal transmitting devices currently observable by the intelligent device included in the sliding window estimator, s represents an integer greater than or equal to 0, $B_0$ represents the body frame of the intelligent device when the $0^{th}$ AoA is obtained, $B_k$ represents the body frame of the intelligent device when the $k^{th}$ AoA is obtained, $x_{B_k}^{B_0} = [p_{B_k}^{B_0}, v_{B_k}^{B_k}, g^{B_k}]$ represents an obtained $k^{th}$ state variable of the intelligent device, $p_{B_k}^{B_0}$ represents a position matrix of the frame $B_0$ relative to the frame $B_k$, $v_{B_k}^{B_k}$ represents a velocity matrix of the frame $B_k$ relative to the frame $B_k$, $g^{B_k}$ represents an earth gravity vector in the frame $B_k$, a value of i satisfies $1 \le i \le N_2$, and $a_i$ represents a position of the $i^{th}$ wireless signal transmitting device.

Figure 2:
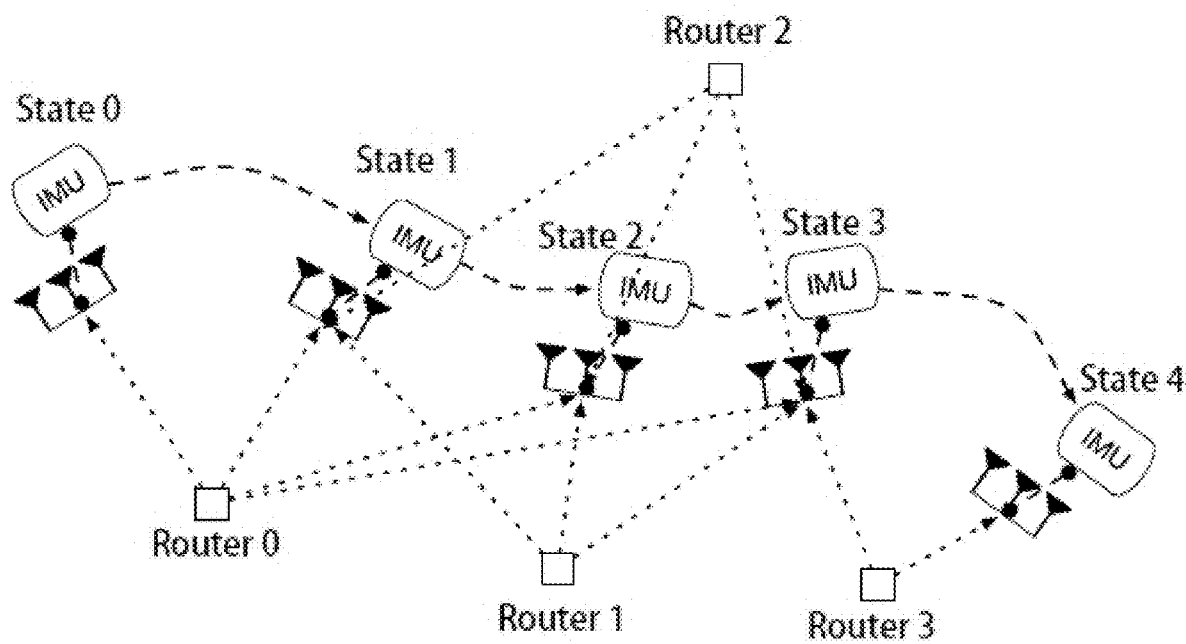
FIG. 2 is a schematic diagram showing data fusion of AoAs and ToFs between an intelligent device and one or more wireless signal transmitting devices as well as inertial parameters of the intelligent device according to the embodiments of the present disclosure.

Through achieving state estimation of the intelligent device with a sliding window estimator, the state estimation problem can be solved with stable computation time complexity. Since the data output rate of the IMU in the intelligent device navigation system is higher than the AoA output rate of the wireless positioning module, more than one IMU measurement data is obtained between when the $k^{th}$ AoA is obtained and when the $(k+1)^{th}$ AoA is obtained. In the intelligent device navigation system, the antenna array has been azimuthally calibrated with the IMU, and a transfer matrix between the body frame of the intelligent device and the frame of the wireless positioning module is known. When the sliding window estimator is used to estimate the state variables of the intelligent device, the operation model of the intelligent device navigation system is shown in FIG. 2.

In addition, since the sliding window estimator contains both state variables of the intelligent device and position information of the wireless signal transmitting devices, position information of the wireless signal transmitting device can be obtained while a state variable of the intelligent device can be obtained by solving the model.

(4) Adjust a motion state of the intelligent device with reference to the state variable, thereby achieving autonomous navigation of the intelligent device.

Since wireless signal resources (e.g., WiFi resources) are ubiquitous in indoor locations, and wireless signal resources can provide reliable information about the environment (e.g., AoA and ToF), the intelligent device navigation method according to the present disclosure utilizes wireless positioning technology to measure the AoA and ToF between the intelligent device and the wireless signal transmitting device in the environment, and to estimate the state variable of the intelligent device in combination with the inertial parameters of the intelligent device, thereby achieving accurate autonomous navigation of the intelligent device.

Figure 3:
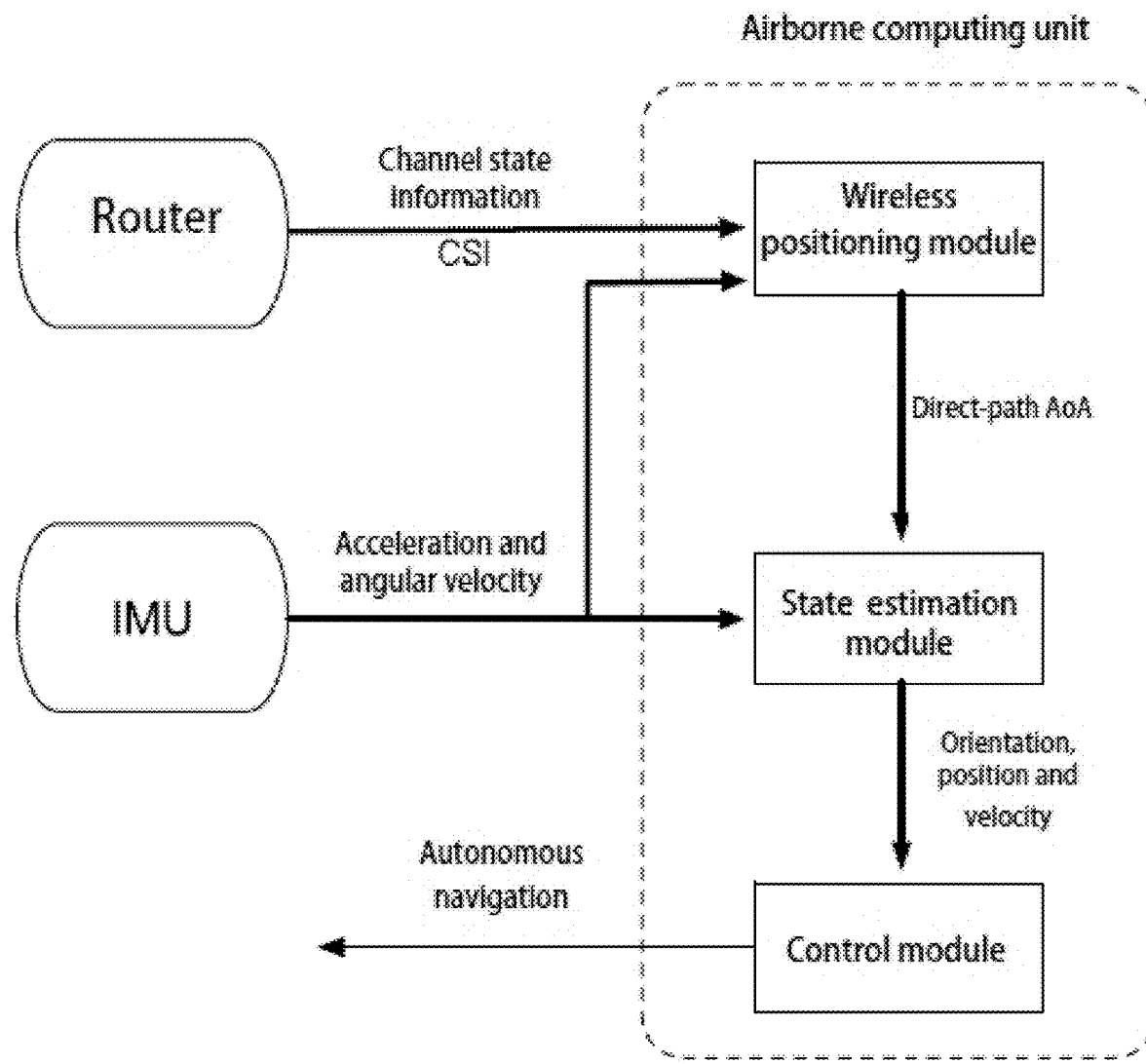
FIG. 3 is a schematic diagram of an intelligent device navigation system according to the embodiments of the present disclosure.

The present disclosure further provides an intelligent device navigation system for achieving autonomous navigation of an intelligent device. As shown in FIG. 3, the system includes: a wireless positioning module, an inertial measurement unit, a state estimation module and a control module.

The wireless positioning module is configured to acquire CSI of a wireless signal transmitted by a wireless signal transmitting device in an environment by using an antenna array and estimate an AoA and a ToF between the wireless signal transmitting device and the intelligent device.

The inertial measurement unit is configured to measure inertial parameters of the intelligent device.

The state estimation module is configured to perform data fusion of the AoAs, the ToFs and the inertial parameters by a sliding window estimator to estimate a state variable of the intelligent device.

The control module is configured to adjust a motion state of the intelligent device with reference to the state variable, thereby achieving autonomous navigation of the intelligent device.

In which, the wireless signal is an OFDM signal, the sliding window estimator is configured to save the latest state variables of the intelligent device and position information of the wireless signal transmitting device(s), and the antenna array is a linear antenna array composed by a plurality of antennas on a network card in the intelligent device, each of the antenna being an array element.

In the present embodiment, modes for carrying out the functional modules may refer to the description in the foregoing method embodiments, and are not repeated herein.

Figure 4A:
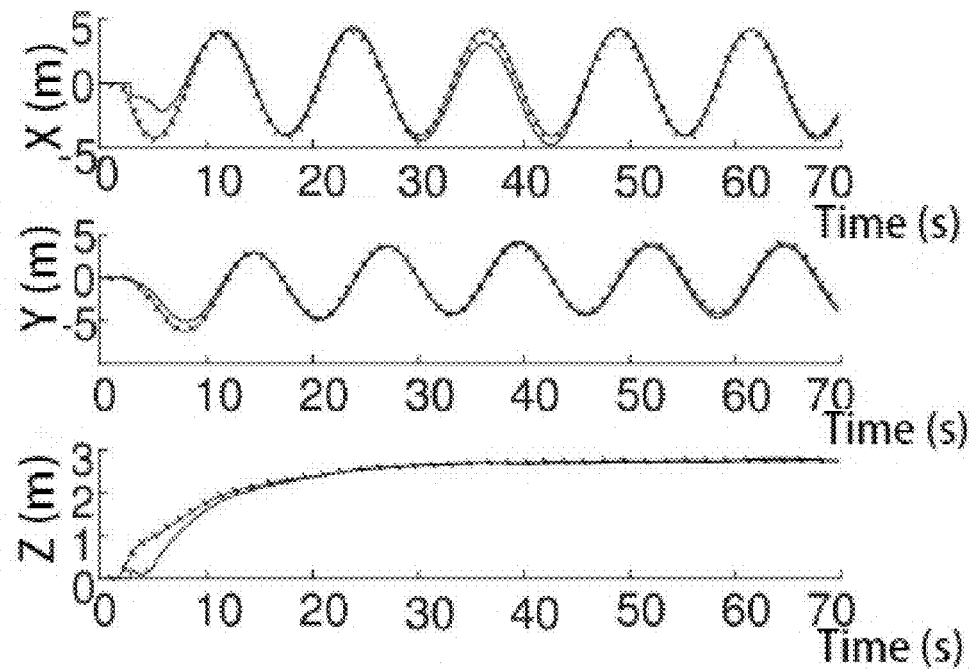
FIGS. 4A and 4B are diagrams showing state estimation according to the embodiments of the present disclosure.
Figure 4B:
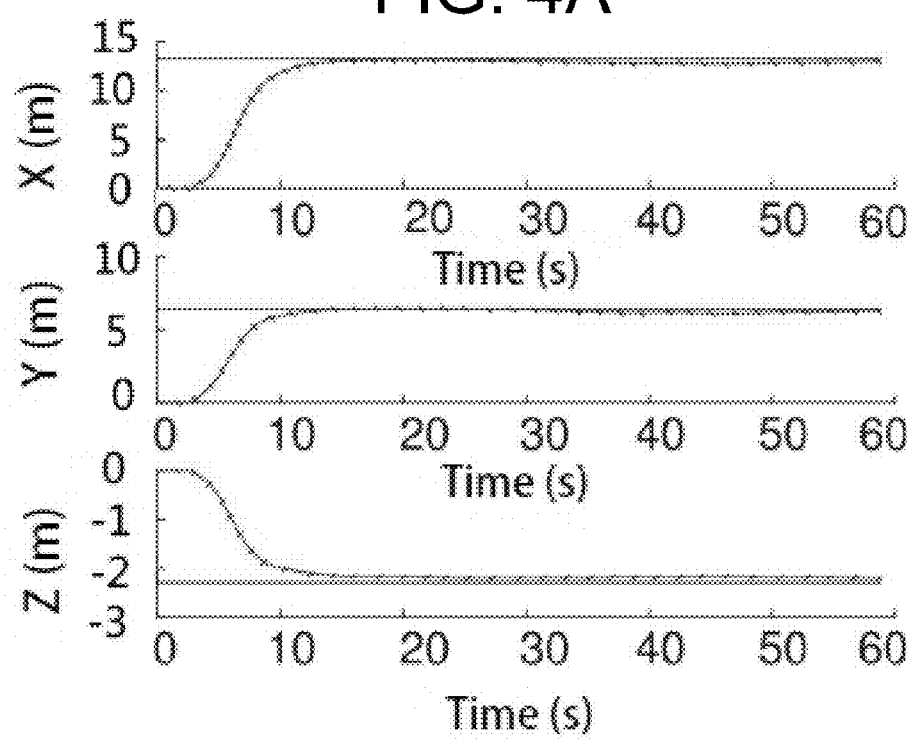

A motion track is preset, and the final navigation effect achieved by the intelligent device navigation method and navigation system according to the present disclosure is shown in FIGS. 4A and 4B. FIG. 4A shows a difference between the actual three-dimensional position of the intelligent device in the X, Y, Z direction and the preset motion trajectory at any time, which reflects the navigation error. Curves with intersections correspond to an actual motion trajectory of the intelligent device, and curves without intersections correspond to the preset motion trajectory. As can be seen from the results shown in FIG. 4A, change in values of the estimated trajectory on the x-y-z coordinate axes is very close to that of the actual motion trajectory, indicating that the intelligent device navigation method and navigation system according to the present disclosure can accurately estimate the trajectory of the intelligent device. FIG. 4B shows a positioning effect of a signal transmitting end (such as a router), in which curves with intersections correspond to estimated router positions, and the straight lines without intersections corresponds to an actual position of the router. Initially, the router's position is assumed to be (0, 0, 0). Then, the system gradually corrects the router's position by calculation, so that the router's position gets close to the real position after about 10 seconds. It can be seen from the results in FIG. 4B that the intelligent device navigation method and navigation system according to the present disclosure can accurately estimate the position of the router while achieving autonomous navigation of the intelligent device. Therefore, even in GPS unreliable environments, the present disclosure can achieve accurate autonomous navigation of the intelligent device, thereby solving problems such as complicated calculation, susceptibility to lighting conditions, expensive equipment, heavy weight and limited application caused by positioning by virtue of visual sensing and laser sensing in the existing navigation systems.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. An intelligent device navigation method for achieving autonomous navigation of an intelligent device, comprising:
   (1) constructing a plurality of antennas on a network card in the intelligent device into a linear antenna array, wherein each of the antenna is an array element;
   (2) by using the linear antenna array, acquiring channel state information (CSI) of a wireless signal transmitted by a wireless signal transmitting device in an environment, and estimating an angle of arrival (AoA) and a time of flight (ToF) between the wireless signal transmitting device and the intelligent device; measuring inertial parameters of the intelligent device by using an inertial measurement unit;
   (3) performing data fusion of the AoAs, the ToFs and the inertial parameters by a sliding window estimator to estimate a state variable of the intelligent device;
   (4) adjusting a motion state of the intelligent device with reference to the state variable, thereby achieving autonomous navigation of the intelligent device,
   wherein the wireless signal is an orthogonal frequency-division multiplexing (OFDM) signal, and the sliding window estimator is configured to save the latest state variables of the intelligent device and position information of the current observable wireless signal transmitting device(s).

2. The intelligent device navigation method of claim 1, wherein in the step (2), a method of estimating the AoA and the ToF between the wireless signal transmitting device and the intelligent device comprises:
   (21) superimposing the CSIs of N OFDM signal subcarriers received by the linear antenna array to obtain a measurement signal matrix X', and performing CSI smoothing on the measurement signal matrix X' to obtain a signal measurement matrix X whose rank is larger than a number of wireless signal travel paths;
   (22) according to a steering vector model and the signal measurement matrix X, acquiring an AoA and a ToF corresponding to each travel path by a multiple signal classification (MUSIC) algorithm; and
   (23) determining a travel path having a minimum ToF as a direct path, and determining an AoA and the ToF corresponding to the direct path as the AoA and the ToF between the wireless signal transmitting device and the intelligent device,
   wherein the steering vector model is used to describe, by using the AoA and the ToF, a phase offset introduced by the respective array elements.

3. The intelligent device navigation method of claim 2, wherein the steering vector model is:

$$\vec{a}(\theta, \tau) = \left[ \underbrace{1, \Omega_\tau^1, \Omega_\tau^2, \ldots, \Omega_\tau^{N-1}}_{element\ 1},\ \underbrace{\Phi_\theta, \Omega_\tau^1 \Phi_\theta, \Omega_\tau^2 \Phi_\theta, \ldots, \Omega_\tau^{N-1} \Phi_\theta}_{element\ 2},\ \ldots,\ \underbrace{\Phi_\theta^{M-1}, \ldots, \Omega_\tau^{N-1} \Phi_\theta^{M-1}}_{element\ M} \right]^T,$$

wherein $\Phi_\theta$ and $\Omega_\tau$ are respectively expressed as:

$\Phi_\theta = e^{-j2\pi \times d \times \sin(\theta) \times f/c}$; and $\Omega_\tau = e^{-j2\pi \times f_\delta \times \tau}$, wherein the superscript represents an exponent of the power operation, $\theta$ represents an AoA, $\tau$ represents a ToF, $\vec{a}(\theta, \tau)$ represents a phase offset caused by the array elements corresponding to a travel path with an AoA of $\theta$ and a ToF of $\tau$, $\Phi_\theta$ represents a phase offset introduced by the array elements corresponding to a travel path with AoA of $\theta$, $\Omega_\tau$ represents a phase offset introduced by the array elements corresponding to a travel path with ToF of $\tau$, d represents a spacing between two adjacent array elements, f represents a frequency of a transmitted signal, c represents a velocity of light, $f_\delta$ represents a frequency spacing between adjacent subcarriers, and M and N respectively represent the number of array elements in the linear antenna array and the number of subcarriers for the transmission of wireless signals.

4. The intelligent device navigation method of claim 1, wherein the step (3) includes the following steps:
   (31) constructing a measurement information matrix of the inertial measurement unit according to the inertial parameters measured by the inertial measurement unit, and calculating a measurement vector of the inertial measurement unit;
   (32) constructing a measurement information matrix of wireless signals according to CSIs of the acquired wireless signals, and calculating a measurement vector of the wireless signals;
   (33) according to the sliding window estimator, the measurement information matrix and the measurement vector of the inertial measurement unit, and the measurement information matrix and the measurement vector of the wireless signals, calculating a current sliding window estimator by minimizing a sum of Mahalanobis norm of all measurement errors; taking the latest state variable in the current sliding window estimator as the estimated state variable.

5. The intelligent device navigation method of claim 4, wherein in the step (31), the measurement vector of the inertial measurement unit is calculated according to an equation below:

$$\hat{z}_{1\,B_{k+1}}^{B_k} = \begin{bmatrix} \hat{\alpha}_{B_{k+1}}^{B_k} \\ \hat{\beta}_{B_{k+1}}^{B_k} \\ \hat{0} \end{bmatrix} =$$

-continued $$\begin{bmatrix} R_{B_0}^{B_k}(p_{B_{k+1}}^{B_0} - p_{B_k}^{B_0}) - v_{B_k}^{B_k}\Delta t + \frac{g^{B_k}\Delta t^2}{2} \\ R_{B_{k+1}}^{B_k} v_{B_{k+1}}^{B_{k+1}} - v_{B_k}^{B_k} + g^{B_k}\Delta t \\ R_{B_{k+1}}^{B_k} g^{B_{k+1}} - g^{B_k} \end{bmatrix} = \widehat{\mathbb{H}}_{1\,B_{k+1}}^{B_k}\chi + n_{1\,B_{k+1}}^{B_k},$$

wherein $B_0$ represents a body frame of the intelligent device when a $0^{th}$ AoA is obtained, $B_k$ and $B_{k+1}$ respectively represent body frames of the intelligent device when $k^{th}$ and $(k+1)^{th}$ AoAs are obtained, $$\widehat{z}_{1\,B_{k+1}}^{B_k}$$

represents a measurement information matrix of the inertial measurement unit between when the $k^{th}$ AoA is obtained and when the $(k+1)^{th}$ AoA is obtained, $\hat{\alpha}_{B_{k+1}}^{B_k}$ and $\hat{\beta}_{B_{k+1}}^{B_k}$ are both covariance matrixes calculated by the measurement information matrix $$\widehat{z}_{1\,B_{k+1}}^{B_k},$$

$R_{B_0}^{B_k}$ represents a transfer matrix of the frame $B_k$ relative to the frame $B_0$, $p_{B_{k+1}}^{B_0}$ represents a position matrix of the frame $B_0$ relative to the frame $B_{k+1}$, $\Delta t$ represents a time difference between when the $k^{th}$ AoA is obtained and when the $(k+1)^{th}$ AoA is obtained, $R_{B_{k+1}}^{B_k}$ represents a transfer matrix of the frame $B_k$ relative to the frame $B_{k+1}$, $v_{B_{k+1}}^{B_{k+1}}$ represents a velocity matrix of the frame $B_{k+1}$ relative to the frame $B_{k+1}$, $g^{B_{k+1}}$ represents an earth gravity vector in the frame $B_{k+1}$, $$\widehat{\mathbb{H}}_{1\,B_{k+1}}^{B_k}$$

represents a measurement vector of the inertial measurement unit, $$n_{1\,B_{k+1}}^{B_k}$$

represents a measurement noise of the inertial measurement unit, and $\chi$ represents a full state parameter vector composed of all state variables and position information of the wireless signal transmitting devices in the sliding window estimator.

6. The intelligent device navigation method of claim 4, wherein in the step (32), the measurement vector of the wireless signals is calculated according to an equation below:

$$\widehat{z}_{2\,l}^{B_j} =$$

$$\hat{0} = \begin{bmatrix} -1 & 0 & \hat{u}_l^{B_j} \\ 0 & -1 & \hat{v}_l^{B_j} \end{bmatrix} \left( R_{B_0}^{B_j} \left( p_{B_k}^{B_0} - p_{B_j}^{B_0} + d_l R_{B_i}^{B_0} \begin{bmatrix} u_l^{B_i} \\ v_l^{B_i} \\ 1 \end{bmatrix} \right) \right) = \widehat{\mathbb{H}}_{2\,l}^{B_j}\chi + n_{2\,l}^{B_j},$$

wherein $B_0$ represents a body frame of the intelligent device when a $0^{th}$ AoA is obtained, $B_k$, $B_i$ and $B_j$ respectively represent body frames of the intelligent device when $k^{th}$, $i^{th}$ and $j^{th}$ AoAs are obtained, $\widehat{z}_{2\,l}^{B_j}$ represents a signal matrix measured from a $l^{th}$ wireless signal transmitting device when the $j^{th}$ AoA is obtained, $\hat{u}_l^{B_j}$ represents the cosine of the measurement value of the AoA, $\hat{v}_l^{B_j}$ represents the sine of the measurement value of the AoA, $u_l^{B_i}$ represents the cosine of the true value of the AoA, $v_l^{B_i}$ represents the sine of the true value of the AoA, $R_{B_0}^{B_j}$ represents a transfer matrix of the frame $B_j$ relative to the frame $B_0$, $p_{B_{k+1}}^{B_0}$ represents a position matrix of the frame $B_0$ relative to the frame $B_{k+1}$, $p_{B_j}^{B_0}$ represents a position matrix of the frame $B_0$ relative to the frame $B_j$, $R_{B_i}^{B_0}$ represents a transfer matrix of the frame $B_0$ relative to the frame $B_i$, $d_l$ represents a distance between the $l^{th}$ wireless signal transmitting device and the intelligent device, $\widehat{\mathbb{H}}_{2\,l}^{B_j}$ represents a measurement vector measured from the $l^{th}$ wireless signal transmitting device when the $j^{th}$ AoA is obtained, $n_{2\,l}^{B_j}$ represents a measurement noise of the wireless signals, and $\chi$ represents a full state parameter vector composed of all state variables and position information of the wireless signal transmitting devices in the sliding window estimator.

7. The intelligent device navigation method of claim 4, wherein in the step (33), the current sliding window estimator is calculated according to an equation below:

$$(\Lambda_p + \Lambda_{imu} + \Lambda_{WiFi})\chi = (b_p + b_{imu} + b_{WiFi}) \tag{1},$$

wherein $b_p$ are $\Lambda_p$ are both priori information of the intelligent device, $\Lambda_{imu}$ and $b_{imu}$ respectively represent the measurement information matrix and the measurement vector of the inertial measurement unit, $\Lambda_{WiFi}$ and $b_{WiFi}$ respectively represent the measurement information matrix and the measurement vector of the wireless signals, and $\chi$ represents a full state parameter vector composed of all state variables and position information of the wireless signal transmitting devices in the sliding window estimator.

8. The intelligent device navigation method of claim 7, wherein the sliding window estimator slides with an increase in the number of obtained AoAs, and when the sliding window estimator slides, the old state variable and the position information of the unobservable wireless signal transmitting device are removed by applying Schur complement to the least square equations corresponding to the equation (1).

9. The intelligent device navigation method of claim 5, wherein the full state parameter vector $\chi$ is expressed as:

$$\chi = [x_{B_s}^{B_0}, x_{B_{s+1}}^{B_0}, \ldots, x_{B_{N_1+s-1}}^{B_0}, a_1, a_2, \ldots, a_{N_2}],$$

wherein $N_1$ and $N_2$ respectively represent the total number of state variables and the total number of wireless signal transmitting devices currently observable by the intelligent device included in the sliding window estimator, s represents an integer greater than or equal to 0, $B_0$ represents the body frame of the intelligent device when the $0^{th}$ AoA is obtained, $B_k$ represents the body frame of the intelligent device when the $k^{th}$ AoA is obtained, $x_{B_k}^{B_0} = [p_{B_k}^{B_0}, v_{B_k}^{B_k}, g^{B_k}]$ represents an obtained $k^{th}$ state variable of the intelligent device, $p_{B_k}^{B_0}$ represents a position matrix of the frame $B_0$ relative to the frame $B_k$, $v_{B_k}^{B_k}$ represents a velocity matrix of the frame $B_k$ relative to the frame $B_k$, $g^{B_k}$ represents an earth gravity vector in the frame $B_k$, a value of i satisfies $1 \leq i \leq N_2$, and $a_i$ represents a position of the $i^{th}$ wireless signal transmitting device.

10. An intelligent device navigation system for achieving autonomous navigation of an intelligent device, comprising: a wireless positioning module, an inertial measurement unit, a state estimation module and a control module;
wherein the wireless positioning module is configured to acquire channel state information (CSI) of a wireless signal transmitted by a wireless signal transmitting device in an environment by using an antenna array and estimate an angle of arrival (AoA) and a time of flight (ToF) between the wireless signal transmitting device and the intelligent device;
the inertial measurement unit is configured to measure inertial parameters of the intelligent device;
the state estimation module is configured to perform data fusion of the AoAs, the ToFs and the inertial parameters by a sliding window estimator to estimate a state variable of the intelligent device; and
the control module is configured to adjust a motion state of the intelligent device with reference to the state variable, thereby achieving autonomous navigation of the intelligent device,
wherein the wireless signal is an OFDM signal, the sliding window estimator is configured to save the latest state variables of the intelligent device and position information of the wireless signal transmitting device(s), and the antenna array is a linear antenna array composed by a plurality of antennas on a network card in the intelligent device, each antenna being an array element.

11. The intelligent device navigation method of claim 6, wherein the full state parameter vector $\chi$ is expressed as:

$$\chi = [x_{B_s}^{B_0}, x_{B_{s+1}}^{B_0}, \ldots, x_{B_{N_1+s-1}}^{B_0}, a_1, a_2, \ldots, a_{N_2}],$$

wherein $N_1$ and $N_2$ respectively represent the total number of state variables and the total number of wireless signal transmitting devices currently observable by the intelligent device included in the sliding window estimator, s represents an integer greater than or equal to 0, $B_0$ represents the body frame of the intelligent device when the $0^{th}$ AoA is obtained, $B_k$ represents the body frame of the intelligent device when the $k^{th}$ AoA is obtained, $x_{B_k}^{B_0} = [p_{B_k}^{B_0}, v_{B_k}^{B_k}, g^{B_k}]$ represents an obtained $k^{th}$ state variable of the intelligent device, $p_{B_k}^{B_0}$ represents a position matrix of the frame $B_0$ relative to the frame $B_k$, $v_{B_k}^{B_k}$ represents a velocity matrix of the frame $B_k$ relative to the frame $B_k$, $g^{B_k}$ represents an earth gravity vector in the frame $B_k$, a value of i satisfies $1 \leq i \leq N_2$, and $a_i$ represents a position of the $i^{th}$ wireless signal transmitting device.

12. The intelligent device navigation method of claim 7, wherein the full state parameter vector $\chi$ is expressed as:

$$\chi = [x_{B_s}^{B_0}, x_{B_{s+1}}^{B_0}, \ldots, x_{B_{N_1+s-1}}^{B_0}, a_1, a_2, \ldots, a_{N_2}],$$

wherein $N_1$ and $N_2$ respectively represent the total number of state variables and the total number of wireless signal transmitting devices currently observable by the intelligent device included in the sliding window estimator, s represents an integer greater than or equal to 0, $B_0$ represents the body frame of the intelligent device when the $0^{th}$ AoA is obtained, $B_k$ represents the body frame of the intelligent device when the $k^{th}$ AoA is obtained, $x_{B_k}^{B_0} = [p_{B_k}^{B_0}, v_{B_k}^{B_k}, g^{B_k}]$ represents an obtained $k^{th}$ state variable of the intelligent device, $p_{B_k}^{B_0}$ represents a position matrix of the frame $B_0$ relative to the frame $B_k$, $v_{B_k}^{B_k}$ represents a velocity matrix of the frame $B_k$ relative to the frame $B_k$, $g^{B_k}$ represents an earth gravity vector in the frame $B_k$, a value of i satisfies $1 \leq i \leq N_2$, and $a_i$ represents a position of the $i^{th}$ wireless signal transmitting device.

\* \* \* \* \*